(12) United States Patent
Onggosanusi et al.

(10) Patent No.: US 7,948,866 B2
(45) Date of Patent: May 24, 2011

(54) LOW COMPLEXITY DESIGN OF PRIMARY SYNCHRONIZATION SEQUENCE FOR OFDMA

(75) Inventors: Eko N. Onggosanusi, Allen, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 832 days.

(21) Appl. No.: 11/835,244

(22) Filed: Aug. 7, 2007

(65) Prior Publication Data

US 2008/0031186 A1   Feb. 7, 2008

Related U.S. Application Data

(60) Provisional application No. 60/821,671, filed on Aug. 7, 2006, provisional application No. 60/823,262, filed on Aug. 23, 2006, provisional application No. 60/887,090, filed on Jan. 29, 2007, provisional application No. 60/887,282, filed on Jan. 30, 2007.

(51) Int. Cl.
*H04J 11/00* (2006.01)
*H04J 3/06* (2006.01)

(52) U.S. Cl. .................. 370/208; 370/350; 370/503

(58) Field of Classification Search .................. None
See application file for complete search history.

(56) References Cited

U.S. PATENT DOCUMENTS

| 6,006,245 | A  | * | 12/1999 | Thayer | 708/404 |
| 2007/0140106 | A1 | * | 6/2007 | Tsai et al. | 370/208 |
| 2007/0183391 | A1 | * | 8/2007 | Akita et al. | 370/350 |
| 2007/0248068 | A1 | * | 10/2007 | Onggosanusi et al. | 370/338 |
| 2007/0270273 | A1 | * | 11/2007 | Fukuta et al. | 475/206 |

FOREIGN PATENT DOCUMENTS

| KR | 1020030060195 | 7/2003 |
| KR | 1020040055034 | 6/2004 |
| KR | 1020050090731 | 9/2005 |
| KR | 1020060122055 | 11/2006 |

* cited by examiner

*Primary Examiner* — Ricky Ngo
*Assistant Examiner* — Clemence Han
(74) *Attorney, Agent, or Firm* — Ronald O. Neerings; Wade James Brady, III; Frederick J. Telecky, Jr.

(57) ABSTRACT

The present disclosure provides a base station transmitter, a user equipment receiver and methods of operating a base station transmitter and a user equipment receiver. In one embodiment, the base station transmitter is for use with a cellular communication system and includes a scheduling unit configured to provide a primary synchronization sequence that is distinguishable from other primary synchronization sequences employed by adjacent base station transmitters located in contiguous communication cells, wherein a primary synchronization sequence structure is based on a reduced computational complexity for identification of the primary synchronization sequence in a user equipment receiver. Additionally, the base station transmitter also includes a transmit unit configured to transmit a primary synchronization signal corresponding to the primary synchronization sequence.

32 Claims, 5 Drawing Sheets

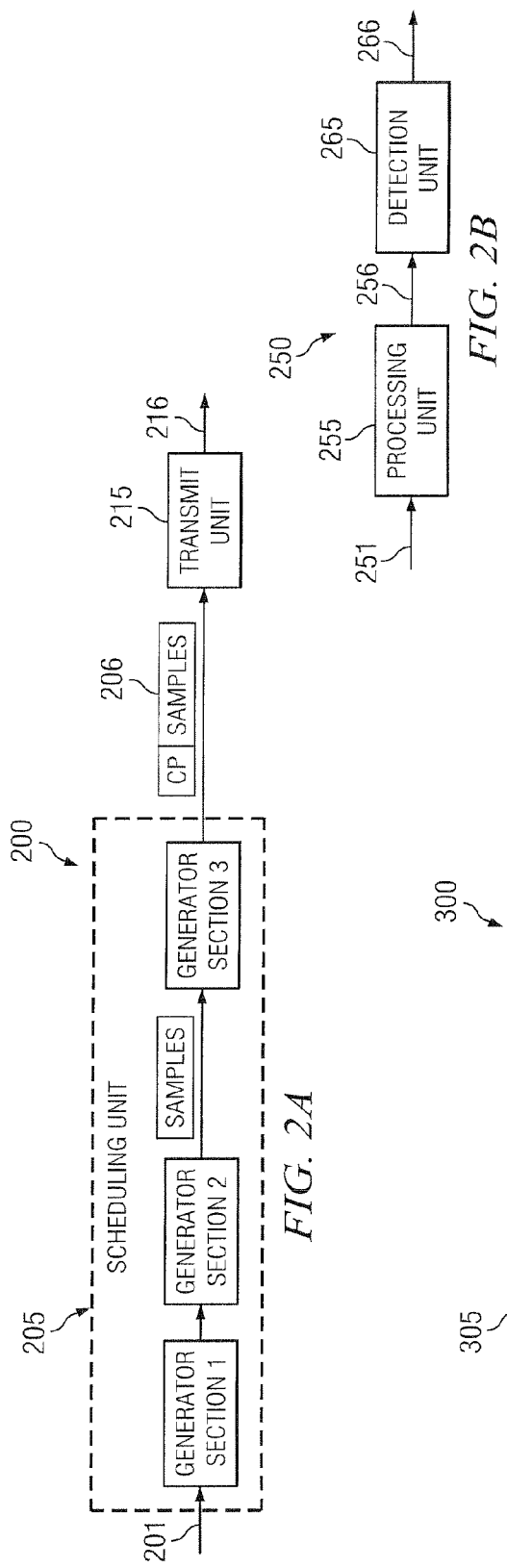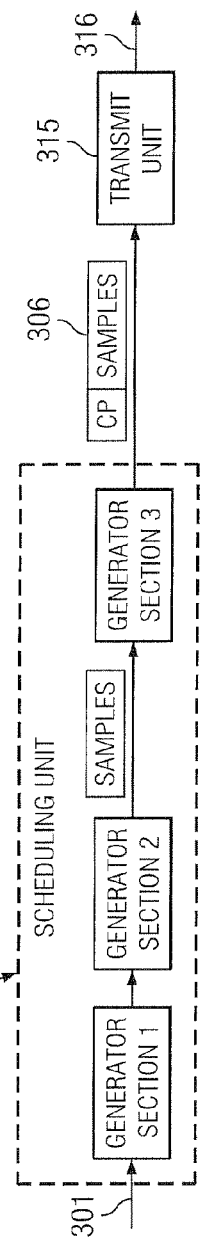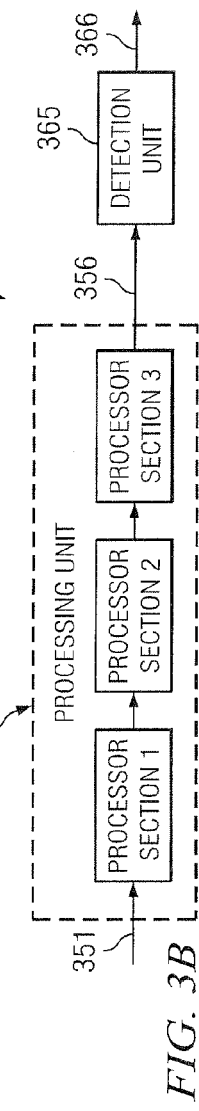

LOW COMPLEXITY DESIGN OF PRIMARY SYNCHRONIZATION SEQUENCE FOR OFDMA

CROSS-REFERENCE TO PROVISIONAL APPLICATION

This application claims the benefit of U.S. Provisional Application No. 60/821671 entitled "Low Complexity Design of Primary Synchronization Code for OFDMA" to Eko N. Onggosanusi and Anand G. Dabak, filed on Aug. 7, 2006, which is incorporated herein by reference in its entirety.

Additionally, this application claims the benefit of U.S. Provisional Application No. 60/823262 entitled "Low Complexity Design of Primary Synchronization Code for OFDMA" to Eko N. Onggosanusi and Anand G. Dabak, filed on Aug. 23, 2006, which is incorporated herein by reference in its entirety.

Further, this application claims the benefit of U.S. Provisional Application No. 60/887090 entitled "Comparison of the Properties of the PSC Proposed by LG" to Eko N. Onggosanusi and Anand G. Dabak, filed on Jan. 29, 2007, which is incorporated herein by reference in its entirety.

Still further, this application claims the benefit of U.S. Provisional Application No. 60/887282 entitled "Comparison of the Properties of the PSC Proposed by LG" to Anand G. Dabak and Eko N. Onggosanusi, filed on Jan. 30, 2007, which is incorporated herein by reference in its entirety.

TECHNICAL FIELD

The present disclosure is directed, in general, to wireless communications and, more specifically, to a base station transmitter, a user equipment receiver and methods of operating the transmitter and the receiver.

BACKGROUND

In a cellular communications network, such as one employing orthogonal frequency division multiple access (OFDMA), each cell employs a base station that communicates with user equipment, such as a cell phone, a laptop, or a PDA, that is actively located within its cell. When the user equipment is first turned on, it has to do an initial cell search in order to be connected to the cellular network. This involves a downlink synchronization process between the base station and the user equipment wherein the base station sends a synchronization signal to the user equipment.

The synchronization signal consists of two parts, which include a primary synchronization signal and a secondary synchronization signal. The primary synchronization signal is used primarily for initial timing, frequency acquisitions and channel estimation by the user equipment. The secondary synchronization signal carries cell-specific information, which uses the channel estimation provided by the primary synchronization signal. Since cellular communications systems offer great flexibility in their use, improvements would prove beneficial in the art.

SUMMARY

The present disclosure provides a base station transmitter, a user equipment receiver and methods of operating a base station transmitter and a user equipment receiver. In one embodiment, the base station transmitter is for use with a cellular communication system and includes a scheduling unit configured to provide a primary synchronization sequence that is distinguishable from other primary synchronization sequences employed by adjacent base station transmitters located in contiguous communication cells, wherein a primary synchronization sequence structure is based on a reduced computational complexity for identification of the primary synchronization sequence in a user equipment receiver. Additionally, the base station transmitter also includes a transmit unit configured to transmit a primary synchronization signal corresponding to the primary synchronization sequence.

In another embodiment, the user equipment receiver is for use with a cellular communication system and includes a processing unit configured to process a plurality of distinguishable primary synchronization signals corresponding to different primary synchronization sequences that are transmitted by adjacent base station transmitters located in contiguous communication cells, wherein a primary synchronization sequence structure is based on a reduced computational complexity for identification of the primary synchronization sequences in the user equipment receiver. Additionally, the user equipment receiver also includes a detection unit configured to identify one of the plurality of different primary synchronization signals corresponding to a communication cell location of the user equipment receiver.

In another aspect, the present disclosure provides a method of operating a base station transmitter that is for use with a cellular communication system. The method includes providing a primary synchronization sequence that is distinguishable from other primary synchronization sequences employed by adjacent base station transmitters located in contiguous communication cells, wherein a primary synchronization sequence structure is based on a reduced computational complexity for identification of the primary synchronization sequence in a user equipment receiver. The method also includes transmitting a primary synchronization signal corresponding to the primary synchronization sequence.

The disclosure also provides a method of operating a user equipment receiver that is for use with a cellular communication system. The method includes processing a plurality of distinguishable primary synchronization sequences that are transmitted by adjacent base station transmitters located in contiguous communication cells, wherein a primary synchronization sequence structure is based on a reduced computational complexity for identification of the primary synchronization sequences in the user equipment receiver. The method also includes identifying one of the plurality of distinguishable primary synchronization signals corresponding to a communication cell location of the user equipment receiver.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which:

FIGS. 2A and 2B illustrate an embodiment of primary synchronization generation and reception based on a frequency-domain primary synchronization sequence;

FIGS. 3A and 3B illustrate an embodiment of primary synchronization generation and reception based on a time-domain primary synchronization sequence;

DETAILED DESCRIPTION

Embodiments of the present disclosure employ communication cells that provide different primary synchronization sequences instead of a single common primary synchronization sequence. This avoids multi-path combining from adjacent base stations. Since different primary synchronization sequences are used within a first tier cell structure, some network planning may be required. Additionally a received signal needs to be correlated with each of the corresponding primary synchronization signal candidates in user equipment. Therefore, it is desirable that the different primary synchronization signals employ a certain structure that is designed to avoid excessive computational complexity at the user equipment.

Figure 1:
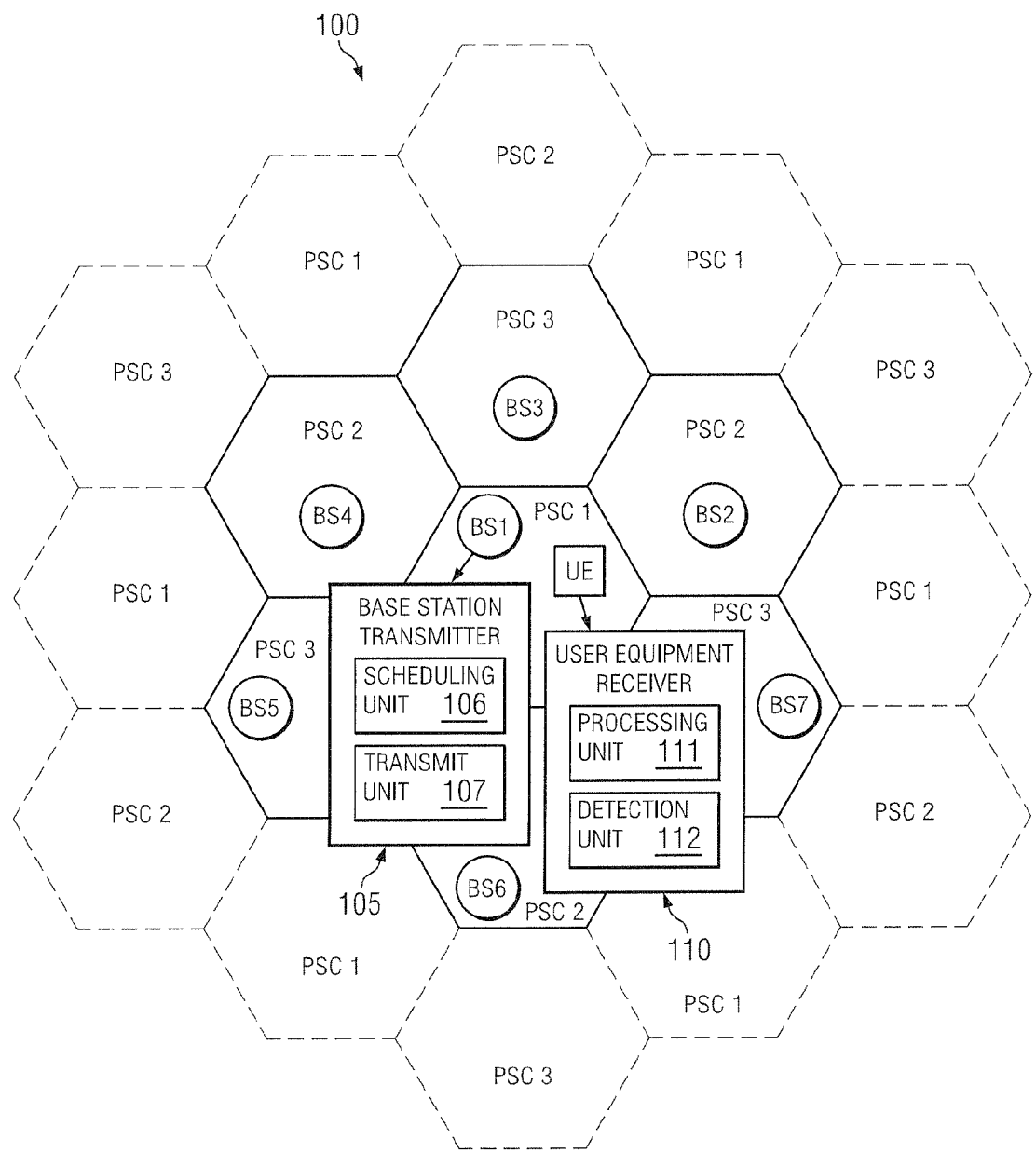
FIG. 1 illustrates a diagram of a cellular communications network as provided by one embodiment of the disclosure.

FIG. 1 illustrates a diagram of a cellular communications network 100 as provided by one embodiment of the disclosure. The cellular network 100 includes a cellular grid having a centric cell and six surrounding first-tier cells. The centric cell employs a centric base station BS1 and the surrounding first-tier cells employ first tier base stations BS2-BS7, as shown. The cellular network 100 also includes user equipment UE, which is located in the centric cell. Three different primary synchronization sequences PSC1, PSC2, PSC3 are employed and advantageously arranged in the cellular network 100, as shown.

The centric base station BS1 includes a base station transmitter 105 having a scheduling unit 106 and a transmit unit 107. In one embodiment, the scheduling unit is configured to provide a primary synchronization sequence that is distinguishable from other primary synchronization sequences employed by adjacent base station transmitters located in contiguous communication cells. The primary synchronization sequences employ a primary synchronization sequence structure that is based on a reduced computational complexity for identification of the primary synchronization sequence in the user equipment UE. The transmit unit 107 is configured to transmit a primary synchronization signal corresponding to the primary synchronization sequence.

The user equipment UE includes a user equipment receiver 110 having a processing unit 111 and a detection unit 112. The processing unit 111 is configured to process a plurality of distinguishable primary synchronization signals corresponding to different primary synchronization sequences that are transmitted by adjacent base station transmitters located in contiguous communication cells. The primary synchronization sequences employ a primary synchronization sequence structure that is based on a reduced computational complexity for identification of the primary synchronization sequences in the user equipment receiver 110. The detection unit 112 is configured to identify one of the plurality of different primary synchronization signals corresponding to a communication cell location of the user equipment receiver 110.

A set three primary synchronization sequences corresponding to the primary synchronization sequences PSC1, PSC2, PSC3 provide the following properties. Each of their corresponding primary synchronization sequence structures provides an auto-correlation function having strong peaks with relatively small side lobe. A pair wise cross-correlation between two of the primary synchronization sequences is also small in comparison.

When the primary synchronization sequences are designed in the time-domain, the primary synchronization sequence structure provides a reduced computational complexity of the timing acquisition. Multiplication (real or complex) is avoided as much as possible. This can be done if the sequences are binary (BPSK) or QPSK in the domain where the correlation is performed (i.e., time-domain or frequency-domain). A hierarchical structure in the primary synchronization sequence offers another level of complexity reduction for the convolution. Two different approaches are considered in the embodiments below. These include the use of frequency-domain or time-domain sequences.

FIGS. 2A and 2B illustrate an embodiment of primary synchronization generation and reception based on a frequency-domain primary synchronization sequence, generally designated 200 and 250, respectively. The generation may be provided by a base station transmitter, and the reception may be provided by a user equipment receiver such as were discussed with respect to FIG. 1.

FIG. 2A shows a block diagram of a transmitter portion 200 that generates and transmits the primary frequency-domain sequence. Correspondingly, FIG. 2B shows a block diagram of a receiver portion 250 that processes and detects reception of the transmitted primary frequency-domain sequence. The transmitter portion 200 includes a scheduling unit 205 and a transmit unit 215. The scheduling unit 205, connected to a sequence input 201, includes first, second and third generator sections GS1, GS2, GS3 and provides a sample output 206 to the transmit unit 215. The receiver portion 250 includes a processing unit 255 and a detection unit 265.

A chosen primary synchronization sequence s(.) of length L is defined in the frequency domain. Here, 3GPP LTE numerology is assumed. A downlink synchronization channel (SCH) occupies and is generated for a 1.25 MHz bandwidth using a 128-point DFT and a 1.92 MHz sampling frequency. Here, the length-L sequence is positioned at the center of the 1.92 MHz sampling bandwidth where zero sub-carriers are added as guard tones in the first generator section GS1. The length L is chosen such that the resulting SCH spectrum does not violate the given spectrum mask. For example, when 90 percent of the 1.25 MHz can be occupied, L is less than or equal to 75 percent.

The second generator section GS2 performs a 128-point IDFT and provides corresponding output samples to the third generator section GS3, which adds a cyclic prefix (CP) to the samples. The transmit unit 215 receives the CP indexed samples on the sample output 206 and provides them for transmission on a transmit output 216.

At the receiver portion 250, cross-correlation between a received signal 251 and all primary SCH candidates is performed in the processing unit 255, wherein the results are provided on an output 256. In the illustrated embodiment, three primary SCH candidates are employed although as many as eight may be employed in other embodiments. The cross-correlation is implemented as a straight time-domain correlation. While a frequency-domain implementation (e.g., overlap-and-save using two FFT length operations) may also be used, it requires an FFT size significantly larger than 128. This is because the length of primary SCH signal is 128 samples (assuming that the CP is not used). Hence, the amount of complexity saving may not be significant. Then, the detection unit 265 selects the appropriate primary synchronization sequence and provides the information on an output 266.

FIGS. 3A and 3B illustrate an embodiment of primary synchronization generation and reception based on a time-domain primary synchronization sequence, generally designated 300 and 350, respectively. The generation may be provided by a base station transmitter, and the reception may be provided by a user equipment receiver such as were discussed with respect to FIG. 1.

FIG. 3A shows a block diagram of a transmitter portion 300 that generates and transmits the primary time-domain sequence. Correspondingly, FIG. 3B shows a block diagram of a receiver portion 350 that processes and detects reception of the transmitted primary time-domain sequence. The transmitter portion 300 includes a scheduling unit 305 and a transmit unit 315. The scheduling unit 305, connected to a sequence input 301, includes first, second and third generator sections GS1, GS2, GS3 and provides a sample output 306 to the transmit unit 315. The receiver portion 350 includes a processing unit 355 and a detection unit 365. The processing unit 355 includes first, second and third processor sections PS1, PS2, PS3.

A chosen primary synchronization sequence s(.) is designed in the time-domain. Instead of using IDFT, the sequence s(.) is applied to the sequence input 301 of the first generator section GS1 where it is modulated with a waveform. Then it is sampled at a desired sampling rate in the second generator section GS2 that matches the sampling rate of the remaining OFDMA signals (in this case, 1.92 MHz). The waveform is chosen such that the resulting primary synchronization signal meets the LTE spectrum mask. This is possible as long as the sequence length L is chosen such that L/128 is less than the desired spectrum occupancy. That is, L is less than or equal to the number of useful sub-carriers.

It is expected that L should be approximately the same whether the design is based on a time-domain or a frequency-domain sequence. An example of the modulating waveform is the square-root raised cosine waveform (SRRC) with a certain roll-off factor. The roll-off factor can be adjusted to satisfy the prescribed LTE spectrum mask.

Since the modulating waveform (such as SRRC) extends over multiple samples, a windowing needs to be applied to obtain one OFDM symbol before adding the CP in the third generator section GS3. This windowing operation is essentially identical to that used in OFDMA to truncate the sinusoids. Hence, the same windowing function may be applied to meet the LTE spectrum mask. The transmit unit 315 receives the CP indexed samples on a sample output 306 and provides them for transmission on a transmit output 316.

At the receiver portion 350, the received signal is matched filtered (MF) with the modulating waveform in the first processor section PS1 and sampled at a sampling rate Fs in the second processor section PS2. The sampling rate Fs is not the same as the OFDMA sampling rate. It is chosen according to the sequence length L where the sampling rate is such that there are L samples per OFDM symbol.

To obtain better sampling resolution, the sampling rate Fs can also be chosen such that there are NL samples (for N>1) per OFDM symbol. A higher sampling rate is not required since the underlying dimensionality or Nyquist rate of the primary synchronization signal per OFDM symbol is equal or proportional to L. After sampling, the resulting signal is correlated with all the candidates of the time-domain sequence in the third processor section PS3 to detect the timing and primary synchronization sequence "index" (i.e., choice). Then, the detection unit 365 selects the appropriate primary synchronization sequence and provides the information to an output 366.

Figures 4, 6, 7:
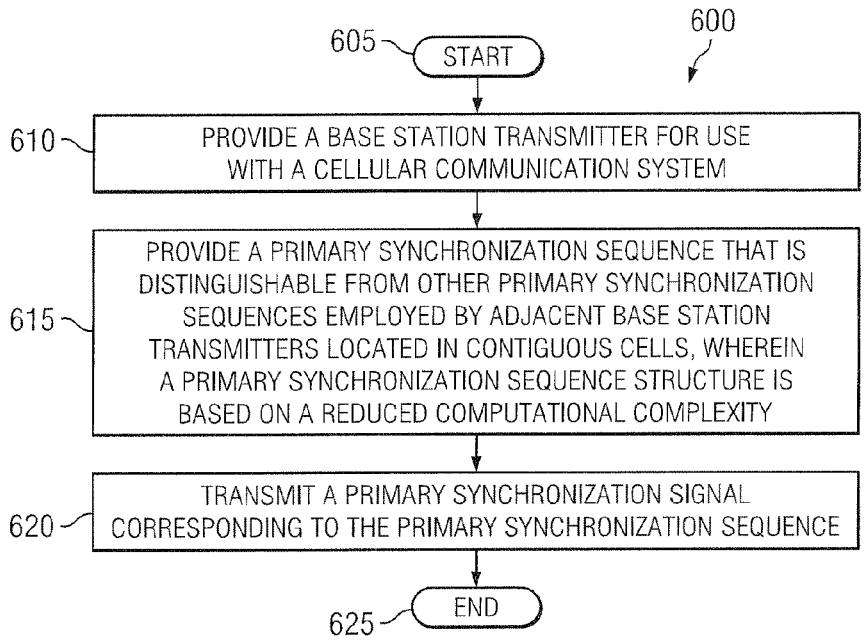
FIG. 4 illustrates an embodiment of a two-level hierarchical structure of a time-domain primary synchronization sequence.
FIG. 6 illustrates a flow diagram of an embodiment of a method of operating a base station transmitter.
FIG. 7 illustrates a flow diagram of an embodiment of a method of operating a user equipment receiver.

FIG. 4 illustrates an embodiment of a two-level hierarchical structure of a time-domain primary synchronization sequence, generally designated 400. When the sequence is designed in the time-domain, it is desirable to further simplify the correlation/convolution operation by imposing a hierarchical structure to the sequence.

The length-L sequence is composed of the outer (Kronecker) product of two shorter sequences (x with length $L_1$ and y with length $L_2$): s=y$\otimes$x. Here, x and y may have the same or different modulation schemes (e.g., x may be BPSK while y is QPSK). With this structure, one convolution with the length-L sequence {s*(L−n)} is replaced by two successive convolutions with length-L1 and length-L2 sequences {x*(L−n)} and {y*(L−n)}. Note that ($L_1$−1) zeros need to be inserted between samples before the second convolution, which corresponds to upsampling by a factor of $L_1$ and results in lower complexity. In general, an M-level hierarchical structure can be defined (i.e., M>2) where $$L = \prod_{i=1}^{M} L_i.$$

Figure 5A:
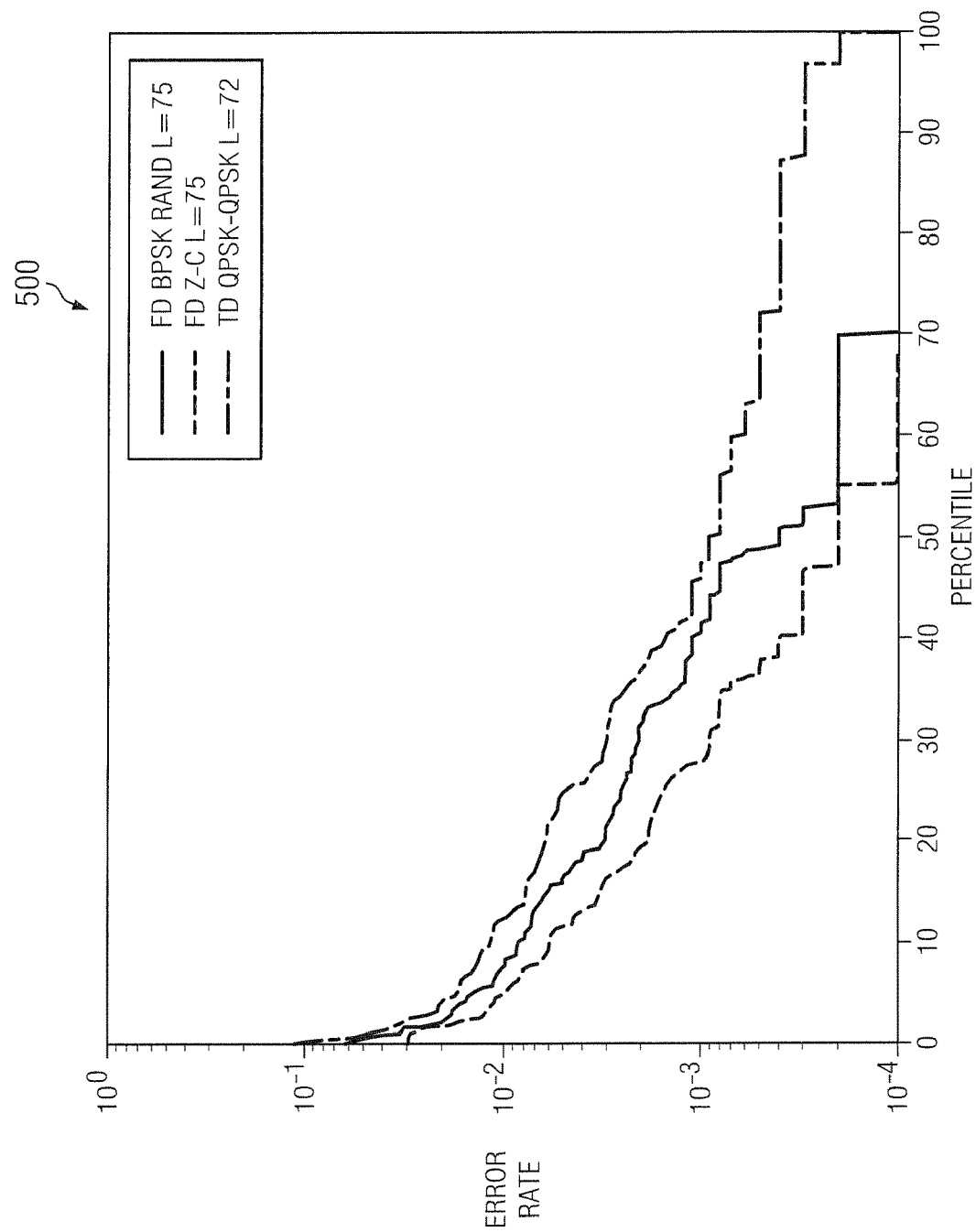
FIGS. 5A and 5B illustrate an error rate chart and a search time chart.
Figure 5B:
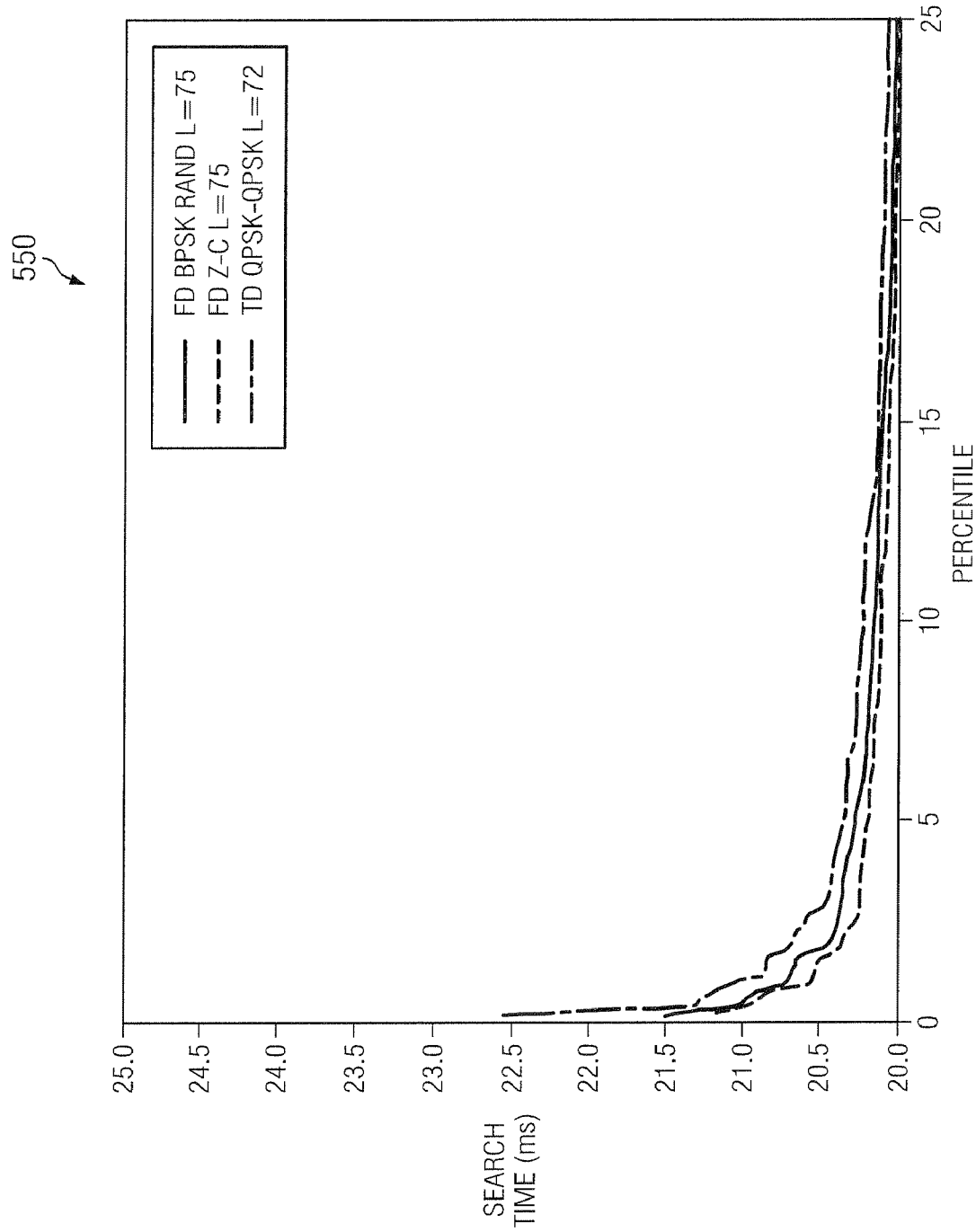

FIGS. 5A and 5B illustrate an error rate chart and a search time chart, generally designated 500 and 550, respectively. The error rate chart 500 and the search time chart 550 show simulation results for two frequency-domain and one time-domain sequences in terms of performance.

Eight time-domain sequences are used to represent the time-domain approach. Two types of sequences are used for the frequency-domain approach. One is a Zadoff-Chu sequence, which is a type of CAZAC sequence, and the other a BPSK random sequence. Notice that the frequency-domain approaches outperform the time-domain approach, which can be attributed to the flatness of the frequency response of the primary SCH in the frequency domain. Such flatness results in better channel estimation. For the time-domain approach, flatness in frequency response typically cannot be achieved especially with the hierarchical sequence structure. However, as evident from the average cell search time, the difference in performance is small. Note that further improvement is still possible with further sequence optimization.

Returning now to FIG. 1, another reduced complexity embodiment of the primary synchronization sequence design is given. First, an analysis of auto and cross correlation properties for primary synchronization sequences constructed according to the principles of the present invention are addressed with a focus on their impact with respect to computational complexity.

Let N be the length of a primary synchronization sequence. Then the Generalized Chirp Like (GCL) sequences are given by:

$$a^M(n) = \exp\left\{-\frac{j*\pi*M*(n)*(n+1)}{N}\right\}. \tag{1}$$

When the length N is a prime number, then the sequence is also called the Zadoff-Chu (ZC) sequence. The M (called the root sequence index) is an integer relatively prime with respect to N and n=0,1,2, . . . , (N−1). For N=37 the integer M can be 1,2, . . . , (N−1). For N=35, then M=1,3,4,6,8,9,11,12, 13,14,16,17,18,19,21,22,23,24,26,27,29,31,32,33,34.

Now choose M1=1 and M4=N−M1, and an interesting property in the sequences may be seen.

$$a^M(n) = \exp\left\{-\frac{j*\pi*M4*(n)*(n+1)}{N}\right\} \quad (2)$$

$$= \exp\left\{-\frac{j*\pi*(N-M1)*(n)*(n+1)}{N}\right\}$$

$$= \exp\left\{\frac{j*\pi*M1*(n)*(n+1)}{N}\right\}*$$

$$\exp\{-j*\pi*n*(n+1)\}$$

Since, n*(n+1) is an even number it implies that exp(−j*π*n*(n+1))=1 all the time. Thus $\alpha^{M4}(n)=(\alpha^{M1}(n))^*$ where the superscript * denotes the complex conjugate operation. Thus, we find the correlation of the received sequence r(n) with respect to the sequence $\alpha^{M1}(n)$, the correlation with respect to $\alpha^{M4}(n)$ can be found easily. This is given by the equations below.

Correlation with respect to $\alpha^{M1}(n)$ is given by:

$$\sum_{n=0}^{N-1} r^*(n)a^{M1}(n) = \quad (3)$$

$$\sum_{n=0}^{N-1}(\text{real}(r(n))\text{real}(a^{M1}(n))) + \sum_{n=0}^{N-1}\text{imag}(r(n))\text{imag}(a^{M1}(n)) +$$

$$j*\left(\sum_{n=0}^{N-1}\text{imag}(r(n))\text{real}(a^{M1}(n)) - \sum_{n=0}^{N-1}\text{real}(r(n))\text{imag}(a^{M1}(n))\right)$$

And, correlation with respect to $\alpha^{M4}(n)$ is given by:

$$\sum_{n=0}^{N-1} r^*(n)a^{M4}(n) = \sum_{n=0}^{N-1}(\text{real}(r(n))\text{real}(a^{M1}(n))) - \quad (4)$$

$$\sum_{n=0}^{N-1}\text{imag}(r(n))\text{imag}(a^{M1}(n))\text{imag}(a^{M1}(n)) -$$

$$j*\left(\sum_{n=0}^{N-1}\text{imag}(r(n))\text{real}(a^{M1}(n)) + \sum_{n=0}^{N-1}\text{real}(r(n))\text{imag}(a^{M1}(n))\right)$$

By looking at the common terms in the equations (3) and (4), it may be seen that correlation with respect to sequence $\alpha^{M4}(n)$ can be obtained from the correlation with respect to $\alpha^{M1}(n)$ with a very small increase in complexity. For N=37, the correlation with respect to M1=1 can be used to easily obtain the correlation with respect to M4=36. Similarly for the pair M2=18 and M3=19. Similarly for the length N=35, an interesting property may be seen for M1=1, M4=34, M2=18 and M3=17.

Now consider the relationship between the correlation with respect to M1=1 and M2=18 by observing the fact that $$M2 = 18 = \frac{(N-M1)}{2}.$$

Substituting this result into the equation for $\alpha^{M2}(n)$ provides:

$$a^{M2}(n) = \exp\left(-\frac{j*\pi*M2*n*(n+1)}{N}\right) \quad (5)$$

$$= \exp\left(-\frac{j*\pi*(N-M1)*n*(n+1)}{2*N}\right)$$

$$= \exp\left(\frac{j*\pi*M1*n*(n+1)}{2*N}\right)*$$

$$\exp\left(-\frac{j*\pi*n*(n+1)}{2}\right)$$

Now observing the fact that n or (n+1) is even implying that $$\frac{(n*(n+1))}{2}$$

is an odd number:

$$a^{M2}(n) = -\exp\left(\frac{j*\pi*M1*n*(n+1)}{2*N}\right) \quad (6)$$

Obtaining the above relationship indicates that there is no apparent simpler formulation for correlation with respect to $\alpha^{M2}(n)$ in terms of $\alpha^{M1}(n)$.

The above examples demonstrate that the symmetry in the root indices of the two time-domain Zadoff-Chu sequences of the same odd length results in a complex conjugate symmetry of the resulting primary synchronization signals. Denoting the resulting primary synchronization signals as $s_1(n)$ and $s_2(n)$, the symmetry can be written as $s_2(n)=s_1^*(n)$. This symmetry is essential in reducing the computational complexity of the timing acquisition process since the number of correlations can be reduced from 3 to 2. This amounts to a 50 percent reduction in acquisition complexity. In addition, the third signal $s_3(n)$ can be freely chosen to optimize the overall pair wise cross-correlation profile.

While the above example utilizes the time-domain Zadoff-Chu sequences, the complex conjugate symmetry can be obtained via other constructions. In general, if $s_1(n)$ has a pseudo-random property (also termed persistently exciting) and $s_2(n)=s_1^*(n)$, the cross-correlation between $s_1(n)$ and $s_2(n)$ is low. Moreover, $s_2(n)$ has the same auto-correlation property as $s_1(n)$. This motivates a construction where $s_1(n)$ is chosen to have a pseudo-random property in addition to some other desirable properties such as finite alphabet, constant modulus, good auto-correlation profile, and low peak-to-average power ratio (PAPR). Then, $s_2(n)=s_1^*(n)$ is enforced for the second primary synchronization signal.

In general, the time-domain construction may result in a non-zero DC term. This can be easily overcome by subtracting the DC terms from the resulting time-domain signals. This does not significantly affect the other desirable properties.

It is also possible to obtain the complex conjugate symmetry via a frequency-domain Zadoff-Chu construction especially when N is odd. Denoting the two frequency-domain sequences as $S_1(k)$ and $S_2(k)$, choosing $S_1(k)=\alpha^{M1}(k)$ and $S_2(k)=\alpha^{M2}(k)$ such that M1+M2=N will result in $S_2(k)=S_1^*(k)$. It can also be shown that $S_m(k)=S_m(N-1-k)$ In addition, when the center element (k=(N−1)/2) is punctured (e.g., assigned to the punctured DC sub-carrier), it can be shown that $s_2(n)=s_1^*(n)$ can be obtained. An example for N=63 is given below. Defining $$a^M(k) = \exp\left(-j\frac{\pi M k(k+1)}{63}\right), k = 0, 1, \ldots, 62 \quad (7)$$

$$S(k) = \begin{cases} a^M(k+31), & -31 \le k \le -1 \text{ or } 1 \le k \le 31 \\ 0, & k = -32, 0 \end{cases}$$

$$s(n) = IDFT\{S(k)\}$$

As an example, choosing M1=29 and M2=34 will result in $s_2(n)=s_1^*(n)$. In LTE, the DC sub-carrier is punctured. Hence the central element is not transmitted and it is set to zero as discussed before.

Note that other constructions and variations of the above examples for attaining the complex conjugate symmetry are also possible and can be obtained by those skilled in the art.

FIG. 6 illustrates a flow diagram of an embodiment of a method of operating a base station transmitter, generally designated 600. The method 600 starts in a step 605. Then, in a step 610, a base station transmitter is provided that is for use with a cellular communication system. In a step 615, a primary synchronization sequence is provided that is distinguishable from other primary synchronization sequences employed by adjacent base station transmitters located in contiguous communication cells. An employed primary synchronization sequence structure is based on a reduced computational complexity for identification of the primary synchronization sequence in a user equipment receiver. Further, a primary synchronization signal corresponding to the primary synchronization sequence is transmitted in a step 620.

The primary synchronization signal and other primary synchronization signals are transmitted concurrently in the method 600, wherein a total of three different primary synchronization sequences are employed for the primary synchronization sequence and the other primary synchronization sequences. Of course, another total may be employed, such as seven or eight, as appropriate to a particular application. In the illustrated embodiment, the primary synchronization sequence and the other primary synchronization sequences comply with an OFDMA specification.

The primary synchronization sequence structure may be provided in the frequency-domain or the time-domain for transmission. Additionally, a resultant first and second primary synchronization signals have a complex conjugate relationship in the time-domain.

In one embodiment, the primary synchronization sequence and the other primary synchronization sequences provide first and second sequence portions that are mirror images of each other around a center position in the frequency domain. Here, the primary synchronization sequences are based on Zadoff-Chu sequences where the summation of first and second root indices employed to define the first and second portions equals a sequence length parameter. Additionally, the first and second root indices are 29 and 34, respectively. The method 600 ends in a step 625.

FIG. 7 illustrates a flow diagram of an embodiment of a method of operating a user equipment receiver, generally designated 700. The method 700 starts in a step 705. Then in a step 710, a user equipment receiver is provided that is for use with a cellular communication system. In a step 715, a plurality of distinguishable primary synchronization sequences is provided that are transmitted by adjacent base station transmitters located in contiguous communication cells. An employed primary synchronization sequence structure is based on a reduced computational complexity for identification of the primary synchronization sequences in the user equipment receiver. Further, a plurality of distinguishable primary synchronization signals corresponding to a communication cell location of the user equipment receiver is identified in a step 720.

The plurality of distinguishable primary synchronization sequences is received concurrently in the method 700, wherein a total of three different primary synchronization sequences are employed for the plurality of distinguishable primary synchronization sequences. Again, another total may be employed as discussed above. In the illustrated embodiment, the plurality of distinguishable primary synchronization sequences complies with an OFDMA specification.

The primary synchronization sequence structure may be provided in the frequency-domain or the time-domain for reception. Additionally, a resultant first and second primary synchronization signals have a complex conjugate relationship in the time-domain.

In one embodiment, the plurality of distinguishable primary synchronization sequences provide first and second sequence portions that are mirror images of each other around a center position in the frequency domain. Here, the primary synchronization sequences are based on Zadoff-Chu sequences where the summation of first and second root indices employed to define the first and second sequence portions equals a sequence length parameter. Additionally, the first and second root indices are 29 and 34, respectively. The method 700 ends in a step 725.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A base station transmitter for use with a cellular communication system, comprising:
   a scheduling unit configured to provide a primary synchronization sequence that is distinguishable from other primary synchronization sequences employed by adjacent base station transmitters located in contiguous communication cells, wherein the primary synchronization sequences are based on Zadoff-Chu sequences where the summation of two root indices equals a sequence length parameter; and
   a transmit unit configured to transmit a primary synchronization signal corresponding to the primary synchronization sequence.

2. The transmitter as recited in claim 1 wherein the primary synchronization sequence structure is provided in the frequency-domain or the time-domain for transmission.

3. The transmitter as recited in claim 1 wherein the primary synchronization sequence and the other primary synchronization sequences employs a total of three different primary synchronization sequences.

4. The transmitter as recited in claim 1 wherein the primary synchronization sequence and the other primary synchronization sequences are configured to provide first and second sequence portions thin are mirror images of each other around a center position in the frequency domain.

5. The transmitter as recited in claim 1 wherein two of the root indices are 29 and 34, respectively.

6. The transmitter as recited in claim 1 wherein two or the primary synchronization sequences have a complex conjugate relationship in the time-domain.

7. The transmitter as recited in claim 1 wherein the primary synchronization signal and other primary synchronization signals are transmitted concurrently.

8. The transmitter as recited in claim 1 wherein the primary synchronization sequence and the other primary synchronization sequences comply with an OFDMA specification.

9. A method of operating a base station transmitter for use with a cellular communication system, comprising:
   providing a primary synchronization sequence that is distinguishable from other primary synchronization sequences employed by adjacent base station transmitters located in contiguous communication cells, wherein the primary synchronization sequences are based on Zadoff-Chu sequences where the summation of two root indices equals a sequence length parameter; and
   transmitting a primary synchronization signal corresponding to the primary synchronization sequence.

10. The transmitter as recited in claim 9 wherein the primary synchronization sequence structure is provided in the frequency-domain or the time-domain for transmission.

11. The method as recited in claim 9 wherein the primary synchronization sequence and the other primary synchronization sequences employ a total of three different primary synchronization sequences.

12. The method as recited in claim 9 wherein the primary synchronization sequence and the other primary synchronization sequences provide first and second sequence portions that are mirror images of each other around a center position in the frequency domain.

13. The method as recited in claim 9 wherein two of the root indices are 20 and 34, respectively.

14. The method as recited in claim 9 wherein two of the primary synchronization sequences have a complex conjugate relationship in the time-domain.

15. The method as recited in claim 9 wherein the primary synchronization signal and other primary synchronization signals are transmitted concurrently.

16. The method as recited in claim 9 wherein the primary synchronization sequence and the other primary synchronization sequences comply with an OFDMA specification.

17. A user equipment receiver for use with a cellular communication system, comprising:
   a processing unit configured to process a plurality of distinguishable primary synchronization signals transmitted by base station transmitters located in contiguous communication cells, wherein the primary synchronization sequences are based on Zadoff-Chu sequences where the summation of two root indices equals a sequence length parameter; and
   a detection unit configured to identify one of the plurality of different primary synchronization signals corresponding to a communication cell serving the user equipment receiver.

18. The receiver as recited in claim 17 wherein the primary synchronization sequence structure is provided in the frequency-domain or the time-domain for reception.

19. The receiver as recited in claim 17 wherein the plurality of different primary synchronization sequences employs a total of three different primary synchronization sequences.

20. The receiver as recited in claim 17 wherein the plurality of different primary synchronization sequences is configured to provide first and second sequence portions that are mirror images of each other around a center position in the frequency domain.

21. The receiver as recited in claim 17 wherein two of the root indices are 29 and 34, respectively.

22. The receiver as recited in claim 17 wherein two of the primary synchronization sequences have a complex conjugate relationship in the time-domain.

23. The receiver as recited in claim 17 wherein the plurality of different primary synchronization sequences is transmitted concurrently.

24. The receiver as recited in claim 17 wherein the plurality of different primary synchronization sequences complies with an OFDMA specification.

25. A method of operating a user equipment receiver for use with a cellular communication system, comprising:
   processing a plurality of distinguishable primary synchronization sequences that are transmitted by base station transmitters located in contiguous communication cells, wherein the primary synchronization sequences are based on Zadoff-Chu sequences where the summation of two root indices equals a sequence length parameter; and
   identifying one of a plurality of distinguishable primary synchronization signals corresponding to a communication cell location of the user equipment receiver.

26. The method as recited in claim 25 wherein the primary synchronization sequence structure is provided in the frequency-domain or the time-domain for reception.

27. The method as recited in claim 25 wherein the plurality of distinguishable primary synchronization sequences employ a total of three different primary synchronization sequences.

28. The method as recited in claim 25 wherein the plurality of distinguishable primary synchronization sequences provide first and second sequence portions that are mirror images of each other around a center position in the frequency domain.

29. The method as recited in claim 25 wherein two of the root indices are 29 and 34, respectively.

30. The method as recited in claim 25 wherein two of the primary synchronization sequences have a complex conjugate relationship in the time-domain.

31. The method as recited in claim 25 wherein the plurality of distinguishable primary synchronization sequences is received concurrently.

32. The method as recited in claim 25 wherein the plurality of distinguishable primary synchronization sequences complies with an OFDMA specification.

* * * * *